US012118958B2

(12) United States Patent
Oh et al.

(10) Patent No.: US 12,118,958 B2
(45) Date of Patent: Oct. 15, 2024

(54) DISPLAY DEVICE AND METHOD FOR DRIVING THE SAME

(71) Applicant: LG Display Co., Ltd., Seoul (KR)

(72) Inventors: Zonggun Oh, Paju-si (KR); Jaehun Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/963,978

(22) Filed: Oct. 11, 2022

(65) Prior Publication Data

US 2023/0119897 A1 Apr. 20, 2023

(30) Foreign Application Priority Data

Oct. 18, 2021 (KR) ........................ 10-2021-0138242

(51) Int. Cl.
*G09G 5/10* (2006.01)

(52) U.S. Cl.
CPC ....... *G09G 5/10* (2013.01); *G09G 2310/0291* (2013.01); *G09G 2310/08* (2013.01); *G09G 2320/0276* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 8,040,363 | B2 | 10/2011 | Park et al. | |
| 10,783,850 | B2 | 9/2020 | Furihata et al. | |
| 11,004,404 | B2 | 5/2021 | Lee et al. | |
| 2008/0186262 | A1 | 8/2008 | Lee | |
| 2016/0203774 | A1* | 7/2016 | Ahn | G02F 1/1336 345/102 |
| 2019/0266952 | A1* | 8/2019 | Pyo | G09G 3/3291 |
| 2019/0295462 | A1 | 9/2019 | Song | |
| 2020/0202801 | A1* | 6/2020 | Lee | G09G 3/3406 |
| 2022/0351661 | A1* | 11/2022 | Choi | G09G 3/20 |

FOREIGN PATENT DOCUMENTS

| | | | |
|---|---|---|---|
| JP | 2006309134 | A | 11/2006 |
| JP | 2019086770 | A | 6/2019 |
| KR | 20200077063 | A | 6/2020 |

* cited by examiner

*Primary Examiner* — Andre L Matthews
(74) *Attorney, Agent, or Firm* — Seed IP Law Group LLP

(57) ABSTRACT

The present disclosure relates to a display device and a method for driving the same. The display device includes: a timing controller which receives a dimming value from the outside, determines a dimming band corresponding to the dimming value, and generates and outputs an image data and a data driving control signal; a data driver which outputs, on the basis of the data driving control signal, a data signal corresponding to the image data; and a display panel which displays an image corresponding to the data signal.

19 Claims, 8 Drawing Sheets

DISPLAY DEVICE AND METHOD FOR DRIVING THE SAME

CROSS-REFERENCE TO RELATED APPLICATIONS

The present application claims priority to Korean Patent Application No. 10-2021-0138242, filed Oct. 18, 2021, the entire contents of which is incorporated herein for all purposes by this reference.

BACKGROUND

Technical Field

The present disclosure relates to a display device and a method for driving the same.

Description of the Related Art

With the development of the information society, various types of display devices are being developed. Recently, various display devices such as a liquid crystal display (LCD), a plasma display panel (PDP), and an organic light emitting display (OLED) are used.

Among them, the organic light emitting display displays an image by using an organic light emitting device. The organic light emitting device (hereinafter, referred to as a light emitting device) is a self-light emitting type and does not require a separate light source, so that the thickness and weight of the display device can be reduced. In addition, the organic light emitting display shows high quality characteristics such as a low power consumption, high luminance, high response speed, etc.

The display device has high power consumption because it is continuously turned on for a period of time to provide information to users. Accordingly, research and development are being made to reduce the power consumption of the display device.

BRIEF SUMMARY

Embodiments provide a display device which distinguishes/identifies/classifies user dimming values by each dimming band and selectively and variably controls power consumption of a data driver, and a method for driving the same.

One embodiment is a display device including: a timing controller which receives a dimming value from outside the display device, determines a dimming band corresponding to the dimming value, and generates and outputs an image data and a data driving control signal; a data driver which outputs, on the basis of the data driving control signal, a data signal corresponding to the image data; and a display panel which displays an image corresponding to the data signal.

The data driving control signal may include a power management signal and a dimming band signal which are for controlling power consumption of the data driver. The data driver may include a power management circuit limiting power consumption set by the power management signal on the basis of the dimming band signal.

In response to the dimming band signal, the power management circuit may control the power consumption to the power consumption set by the power management signal, or may limit the power consumption to power consumption set by the dimming band signal.

When the power consumption set by the power management signal is greater than the power consumption corresponding to the dimming band signal, the power management circuit may limit the power consumption to the power consumption corresponding to the dimming band signal, in response to the dimming band signal.

The power management signal may select power consumption corresponding to a first to i-th values (i is an integer greater than 1) respectively. The power management circuit may set the power consumption corresponding to the power management signal to a default value of the power consumption.

The dimming band signal may select whether to limit the power consumption corresponding to the first to i-th values (i is an integer greater than 1) respectively.

The power management circuit may set the power consumption to the default value when the dimming band signal has a first value.

When the dimming band signal has a j-th value (j is an integer in a range from 2 to i) and the power consumption set by the power management signal is greater than power consumption corresponding to the j-th value, the power management circuit may limit the power consumption to the power consumption corresponding to the j-th value.

The data driving control signal may further include a variable control signal for variably controlling the power consumption.

In response to the variable control signal, the power management circuit may fix the power consumption to the power consumption set by the power management signal or may change the power consumption set by the power management signal in accordance with the dimming band signal.

The power management circuit may control a magnitude of a bias current applied to an output buffer of the data driver, in response to the power consumption.

Another embodiment is a method for driving a display device. The method includes:

determining, by a timing controller, a dimming band corresponding to a dimming value input from outside the display device, and outputting, by a timing controller, an image data and a data driving control signal; outputting, by a data driver, a data signal corresponding to the image data, on the basis of the data driving control signal; and displaying, by a display panel, an image corresponding to the data signal.

The driving control signal may include a power management signal and a dimming band signal which are for controlling power consumption of the data driver. The data driver may limit power consumption set by the power management signal on the basis of the dimming band signal.

The outputting the data signal by the data driver may include: setting, by a power management circuit, the power consumption set by the power management signal to a default value; controlling the power consumption to the default value, in response to the dimming band signal; outputting a bias current to an output buffer in response to the controlled power consumption; and outputting, by the output buffer, the data signal corresponding to the image data by using the bias current.

The outputting the data signal by the data driver may include: setting, by a power management circuit, the power consumption set by the power management signal to a default value; limiting, by the power management circuit, the power consumption to power consumption set by the dimming band signal, in response to the dimming band signal; outputting a bias current to an output buffer in response to the limited power consumption; and outputting, by the output buffer, the data signal corresponding to the image data by using the bias current.

The power management signal may select power consumption corresponding to a first to i-th values (i is an integer greater than 1) respectively. The outputting the data signal by the data driver may include setting the power consumption corresponding to the power management signal to a default value of the power consumption.

The dimming band signal may select whether to limit the power consumption corresponding to the first to i-th values (i is an integer greater than 1) respectively.

The method may further include, after the setting the power consumption corresponding to the power management signal to the default value of the power consumption, setting the power consumption to the default value when the dimming band signal has a first value.

The method may further include, after the setting the power consumption corresponding to the power management signal to the default value of the power consumption, when the dimming band signal has a j-th value (j is an integer in a range from 2 to i) and the power consumption set by the power management signal is greater than power consumption corresponding to the j-th value, limiting the power consumption to the power consumption corresponding to the j-th value.

The data driving control signal may further include a variable control signal for variably controlling the power consumption. The outputting the data signal by the data driver may include, in response to the variable control signal, fixing the power consumption to the power consumption set by the power management signal or changing the power consumption set by the power management signal in accordance with the dimming band signal.

The changing the power consumption set by the power management signal in accordance with the dimming band signal may include controlling a magnitude of a bias current applied to an output buffer of the data driver, in response to the power consumption.

DETAILED DESCRIPTION

Figure 1:
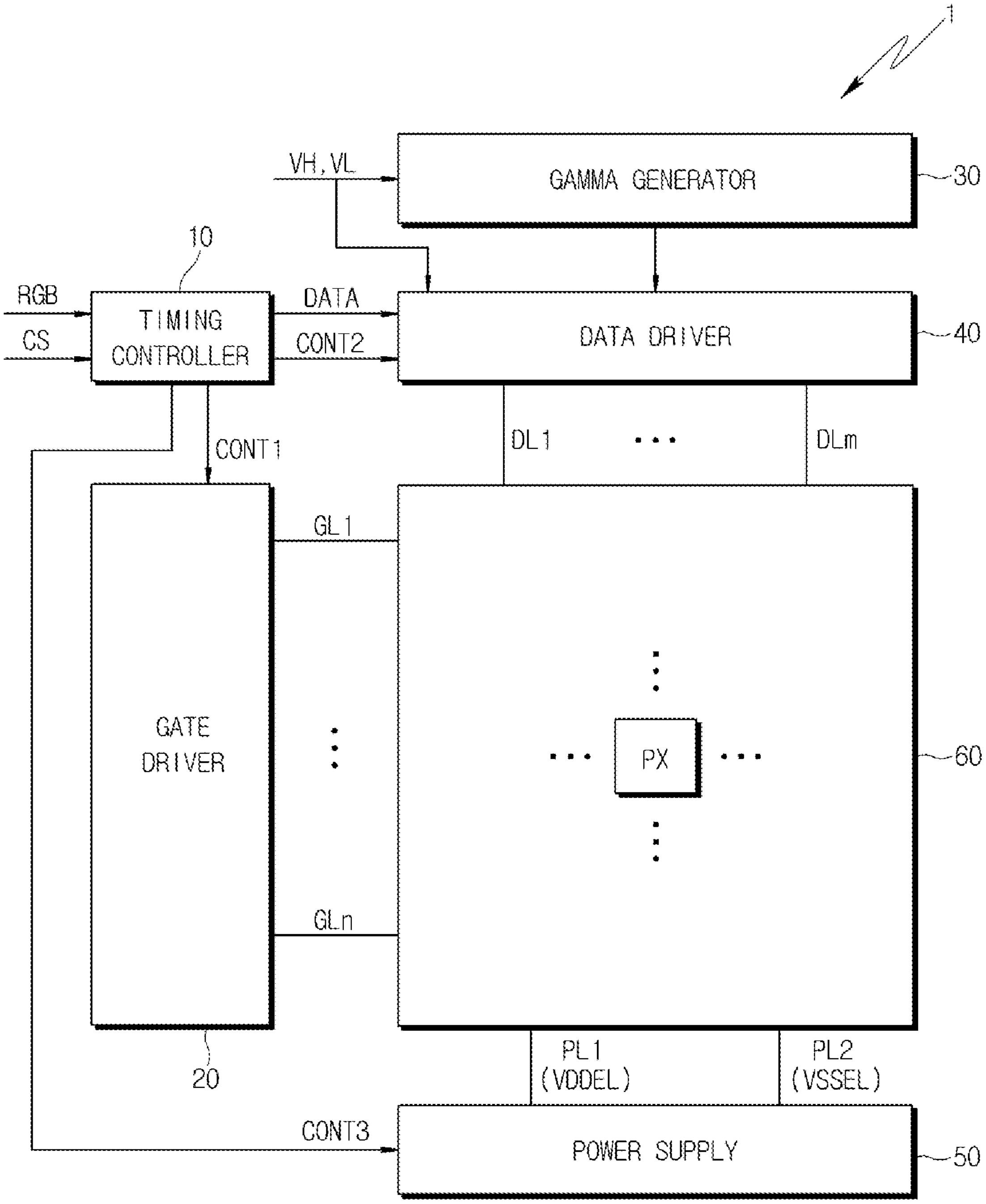
FIG. 1 is a block diagram showing a configuration of a display device according to an embodiment.

Other details of the embodiments are included in the detailed description and drawings.

The features, advantages and method for accomplishment of the present disclosure will be more apparent from referring to the following detailed embodiments described as well as the accompanying drawings. However, the present disclosure is not limited to the embodiment to be disclosed below and is implemented in different and various forms. In the following description, when it is mentioned that a portion is "connected" to another portion, it includes not only "is directly connected" but also "electrically connected" with another element placed therebetween. Also, in the drawings, parts irrelevant to the present disclosure will be omitted for a clear description of the present disclosure. Similar reference numerals will be assigned to similar parts throughout this patent document.

FIG. 1 is a block diagram showing a configuration of a display device according to an embodiment.

Referring to FIG. 1, a display device 1 includes a timing controller 10, a gate driver 20, a gamma generator 30, a data driver 40, a power supply 50, and a display panel 60.

The timing controller 10 may receive an image signal RGB and a control signal CS from the outside (e.g., from a signal source external to the display device 1). The image signal RGB may include multiple gradation data. The control signal CS may include, for example, a horizontal synchronization signal, a vertical synchronization signal, and a main clock signal.

The timing controller 10 may process the image signal RGB and the control signal CS appropriately for operating conditions of the display panel 60, and then may generate and output an image data DATA, a gamma control signal CONT0, a gate driving control signal CONT1, a data driving control signal CONT2, and a power supply control signal CONT3.

The gate driver 20 may be connected to pixels (or sub-pixels) PXs of the display panel 60 through a plurality of gate lines GL1 to GLn. The gate driver 20 may generate gate signals based on the gate driving control signal CONT1 output from the timing controller 10. The gate driver 20 may provide the generated gate signals to the pixels PX through the plurality of gate lines GL1 to GLn.

The gamma generator 30 generates a gamma voltage set VG based on the gamma control signal CONT0 output from the timing controller 10 and on driving voltages VH and VL provided from the power supply 50. In the embodiment, the gamma generator 30 may generate a gamma reference voltage from the driving voltages VH and VL, may select gamma voltages corresponding to multiple gradations from the gamma reference voltage, and then may generate the gamma voltage set VG.

The data driver 40 may be connected to the pixels PX of the display panel 60 through a plurality of data lines DL1 to DLm. The data driver 40 may generate data signals based on the image data DATA and the data driving control signal CONT2 output from the timing controller 10. The data driver 40 may receive the gamma voltage set VG generated by the gamma generator 30, may select a gamma voltage corresponding to the gradation of the image data DATA from the gamma voltage set VG, and then may generate the data signal. The data driver 40 may provide the generated data signals to the pixels PX through the plurality of data lines DL1 to DLm. The data signals may be applied to the pixels PX of a pixel column selected by the gate signal. To this end, the data driver 40 may provide the data signals to the plurality of data lines DL1 to DLm in such a way as to be synchronized with the gate signal.

The power supply 50 may be connected to the pixels PX of the display panel 60 through a plurality of power lines PL1 and PL2. The power supply 50 may generate the driving voltage to be provided to the display panel 60 on the basis of the power supply control signal CONT3. The driving voltage may include, for example, a high potential driving voltage VDDEL and a low potential driving voltage VSSEL. The power supply 50 may provide the generated driving voltages VDDEL and VSSEL to the pixels PX through the corresponding power lines PL1 and PL2.

In the embodiment, the power supply 50 may further generate the driving voltages VH and VL for driving the gamma generator 30. The power supply 50 may supply the generated driving voltages VH and VL to the gamma generator 30.

A plurality of pixels PX (or referred to as sub-pixels) are disposed on the display panel 60. The pixels PX may be arranged, for example, on the display panel 60 in the form of a matrix.

Each pixel PX may be electrically connected to a corresponding gate line and data line. The pixels PX may emit light with luminance corresponding to the gate signal and the data signal provided through the gate lines GL1 to GLn and the data lines DL1 to DLm.

Each pixel PX may display any one of a first to third colors. In the embodiment, each pixel PX may display any one of red, green, and blue. In another embodiment, each pixel PX may display any one of cyan, magenta, and yellow. In various embodiments, the pixels PX may be configured to display any one of four or more colors. For example, each pixel PX may display any one color of red, green, blue, and white.

In FIG. 1, the gate driver 20 and the data driver 40 are shown as separate components from the display panel 60. However, at least one of the gate driver 20 and the data driver 40 may be implemented in an In-Panel method where it is formed integrally with the display panel 60. For example, the gate driver 20 may be integrally formed with the display panel 60 by a gate-in-panel (GIP) method.

The timing controller 10, the gate driver 20, the gamma generator 30, the data driver 40, and the power supply 50 may be each composed of a separate integrated circuit (IC), or may be configured as an IC in which at least some of them are integrated. For example, the timing controller 10, the data driver 40, the gamma generator 30, and the power supply 50 may be composed of a driving chip in the form of an integrated circuit (IC). Such a driving chip may be implemented, for example, in the form of a flexible printed circuit board (FPCB).

Figure 2:
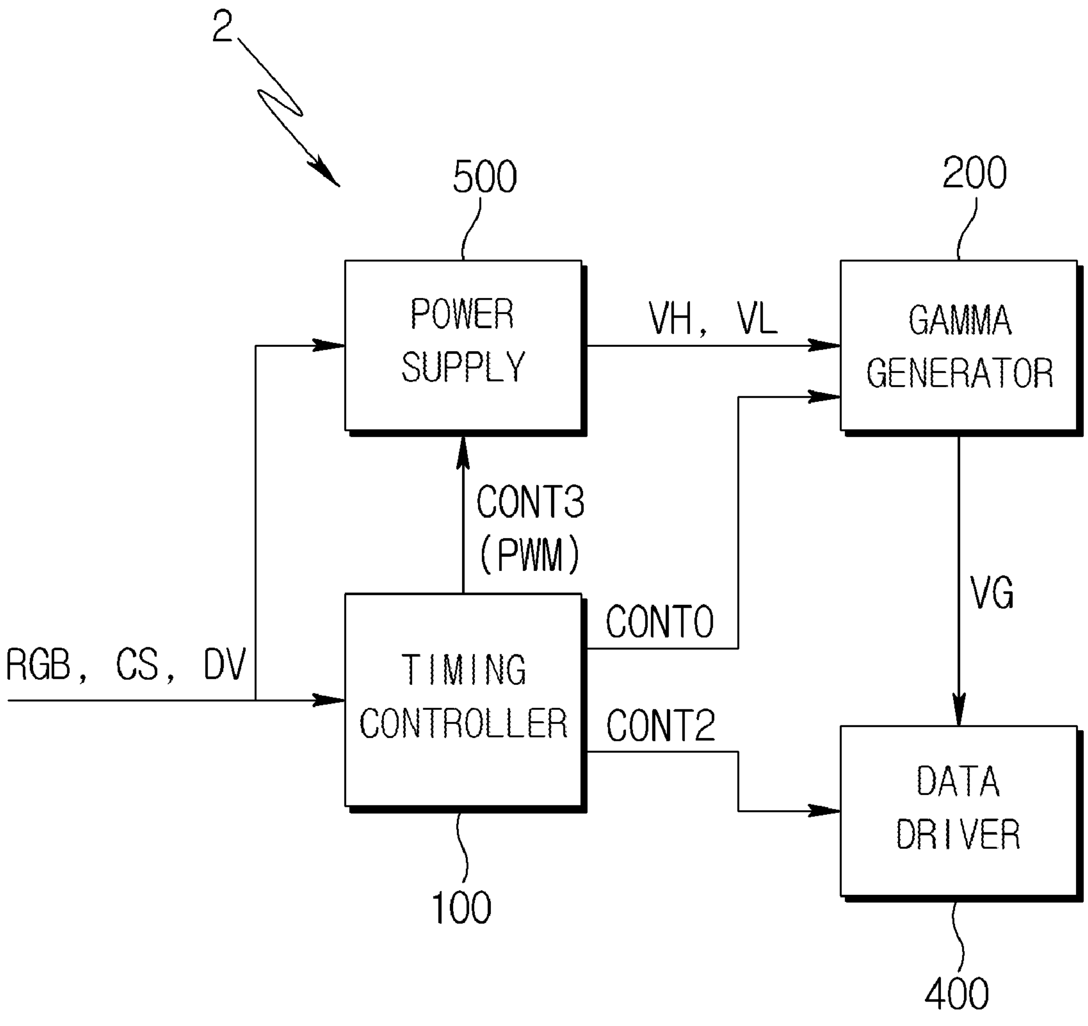
FIG. 2 is a block diagram showing schematically the configuration of the display device according to the embodiment.

FIG. 2 is a block diagram showing schematically the configuration of the display device according to the embodiment.

Referring to FIG. 2, a timing controller 100, a gamma generator 300, a data driver 400, and a power supply 500 of a display device 2 according to the embodiment are schematically shown.

The timing controller 100 may communicate with the outside such as a system controller by using a pulse width modulation (PWM) IC or I2C communication. The timing controller 100 may receive the image signal RGB and the control signal CS from the outside. The image signal RGB may include multiple gradation data. The control signal CS may include, for example, a horizontal synchronization signal, a vertical synchronization signal, and a main clock signal.

In the embodiment, the timing controller 100 may receive a dimming value DV. The dimming value DV represents a ratio of a maximum or increased display luminance to a maximum or increased luminance of the display device 2. The higher the dimming value DV, the higher the maximum or increased display luminance. The dimming value DV may be input from, for example, a user of the display device 2.

The timing controller 100 may detect the input dimming value DV in units of at least one frame. The timing controller 100 may modulate a driving signal PWM based on the dimming value DV, and may provide the modulated driving signal PWM as the power supply control signal CONT3 to the power supply 500.

Also, the timing controller 100 may modulate the input image signal RGB based on the detected dimming value DV and may supply the modulated image data DATA to the data driver 400. Also, the timing controller 100 may generate the data driving control signal CONT2 based on the dimming value DV and may supply the data driving control signal CONT2 to the data driver 400.

The data driving control signal CONT2 supplied to the data driver 400 may include a power management signal for controlling power consumption of the data driver 400, a variable control signal for variably controlling the power consumption, and a dimming band signal for limiting the power consumption on the basis of the dimming value DV. Here, the dimming band is a criterion for controlling the power consumption (i.e., current consumption) set to a default value. For example, a first to i-th (i is an integer greater than 1) dimming bands may be defined or selected.

Such information may be supplied to the data driver 400 in units of at least one frame through the power management signal. A specific packet structure of the power management signal supplied from the timing controller 100 to the data driver 400 will be described in detail below.

The gamma generator 300 generates the gamma voltage set VG based on the gamma control signal CONT0 output from the timing controller 100 and on the driving voltages VH and VL provided from the power supply 500.

In the embodiment, the gamma generator 300 may output a plurality of gamma voltages corresponding to the dimming value DV received from a dimming controller 110 as the gamma voltage set VG. For example, the gamma generator 300 may select the reference voltage set corresponding to the dimming value DV from among preset reference voltage sets corresponding to the first to i-th dimming bands, respectively and may generate the gamma voltage set VG through an interpolation operation between the reference voltage sets.

In the embodiment, the larger the dimming value DV is, the greater the maximum or increased gamma voltage is. The smaller the dimming value DV, the less the maximum or increased gamma voltage. Accordingly, as the dimming value DV increases, a data voltage increases, so that the power consumption of the data driver 400 may increase.

The data driver 400 may receive the image data DATA and the data driving control signal CONT2 output from the timing controller 100. The data driver 400 may communicate with the timing controller 100 through, for example, an embedded clock point-to-point interface (EPI) protocol.

The data driver 400 may receive the gamma voltage set VG from the gamma generator 300, may select a voltage corresponding to the gradation of the image data DATA from among the gamma voltage set VG, and may generate the data signal.

In the embodiment, the data driver 400 may include a power management circuit for controlling power consumption in an output buffer on the basis of the driving control signal CONT2 output from the timing controller 100. The power management circuit may control the amount of current applied to the output buffer on the basis of the power management signal included in the driving control signal CONT2. In the embodiment, the power management circuit may change the current applied to the output buffer on the basis of the variable control signal and the dimming band signal included in the power management signal. As the current consumed by the output buffer is variably controlled, the power consumed by the data driver 400 may be variably controlled. A method for controlling power consumption by the data driver 400 will be described in more detail below.

The power supply 500 may generate the driving voltages VH and VL for driving the gamma generator 300 on the basis of the driving signal PWM received from the timing controller 100. The power supply 500 may supply the driving voltages VH and VL to the gamma generator 300.

Figure 3:
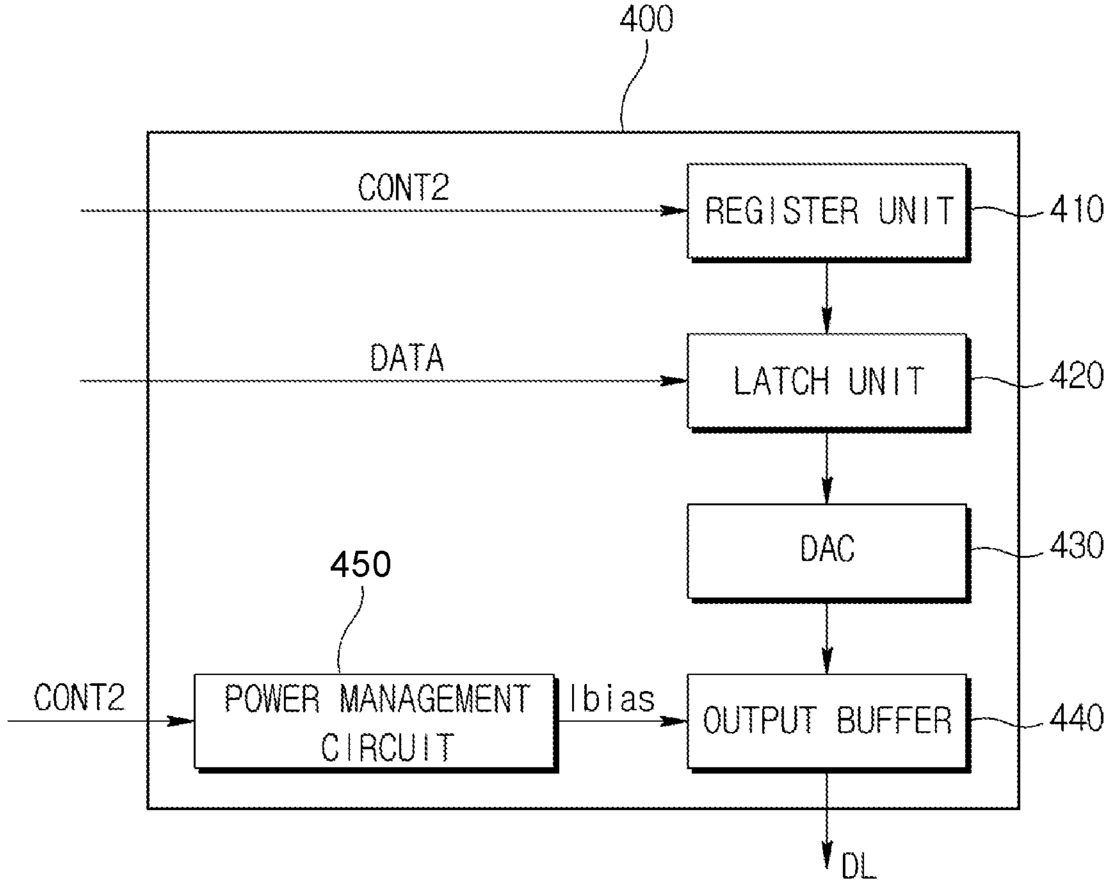
FIG. 3 is a block diagram showing schematically a configuration of a data driver according to the embodiment.

FIG. 3 is a block diagram showing schematically a configuration of the data driver according to the embodiment.

Referring to FIG. 3, the data driver 400 according to the embodiment may include a register unit or circuit 410, a latch unit or circuit 420, a digital-to-analog converter 430, an output buffer 440, and a power management circuit PWRC 450.

The register unit 410 generates a sampling signal by using the data driving control signal CONT2 received from the timing controller 100, and provides the generated sampling signal to the latch unit 420.

The latch unit 420 latches the image data DATA received from the timing controller 100, and outputs the image data DATA to the digital-to-analog converter 430 in response to the sampling signal received from the register unit 410.

The digital-to-analog converter (DAC) 430 converts the image data DATA received from the latch unit 420 into a gamma compensation voltage and generates a data voltage.

The output buffer 440 outputs the data voltage output from the digital-to-analog converter 430 to the data lines DL in accordance with a source output enable signal included in the data driving control signal CONT2.

A plurality of output buffers 440 may be provided. In this embodiment, the output buffers 440 are connected respectively to the data lines disposed in a partial area of the display panel 60. Through the plurality of output buffers 440, the data signal may be applied to the data lines DL1 to DLm disposed in the entire area of the display panel 60.

The power management circuit 450 may apply a bias current Ibias to the output buffer 440 in response to the driving control signal CONT2 transmitted from the timing controller 100. The output buffer 440 may amplify the data voltage on the basis of the bias current Ibias transferred from the power management circuit 450 and may output the amplified data voltage to the data line DL. Here, the power consumption of the output buffer and the power consumption of the data driver 400 can be controlled according to the magnitude of current output from the output buffer 440.

Figure 4:
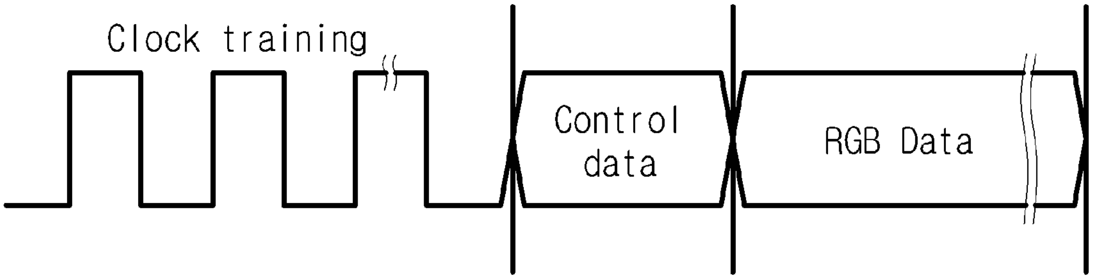
FIG. 4 shows a packet structure of a data driving control signal according to a first embodiment.

FIG. 4 shows a packet structure of the data driving control signal according to a first embodiment.

Referring to FIG. 4, the timing controller 100 sequentially transmits a clock training pattern, control data, and RGB data to the data driver 400.

The clock training pattern is a clock signal for synchronizing operation timings of the timing controller 100 and the data driver 400, and may be a square wave signal.

The control data is the data driving control signal, and may include information indicating the start of the control data, information indicating the start position of the RGB data, and information indicating the rising time and pulse width of the source output enable signal, etc. In addition, the control data may include source control data and gate control data, and may further include information for controlling various functions that can be implemented by the data driver 400.

For example, the control data may include a power management signal for controlling the power consumption of the data driver 400. In addition, the control data may further include the variable control signal and the dimming band signal.

The control data may indicate the above-mentioned information by using a low level or a high level. In the embodiment, bits constituting a first control signal CTR1 of the control data may correspond to information as shown in Table 1.

TABLE 1

| Bit | CTR1 | Default | Update |
|---|---|---|---|
| 0 | CLKH | H | — |
| 1 | | H | — |
| 2 | GSP | L | Last Data |
| 3 | EQ1 | L | Last Data |
| 4 | EQ2 | L | |
| 5 | MODE | L | SOE Start |
| 6 | Reserved | L | — |
| 7 | INVC | L | SOE Start |
| 8 | PWRC1 | L | SOE Start |
| 9 | PWRC2 | L | |
| 10 | Reserved | L | — |
| 11 | PWRC Con | L | SOE Start |
| 12 | Band1 | L | 0 |
| 13 | Band2 | L | |
| 14 | Reserved | L | — |
| 15 | | L | — |
| 16 | | L | — |
| 17 | | L | — |
| 18 | | L | — |
| 19 | | L | — |
| 20 | | L | — |
| 21 | | L | |
| 22 | | L | — |
| 23 | | L | — |
| 24 | | L | — |
| 25 | | L | — |
| Bit | CTR1 | Default | Update |
| 26 | CLKL | L | — |
| 27 | | L | — |

In the first control signal CTR1 of Table 1, the eighth and ninth bits are power management signals PWRC1 and PWRC2 for controlling the power consumption of the data driver 400. In the embodiment, the power management circuit PWRC shown in FIG. 3 may include first and second power management circuits. The power consumption of the data driver 400 may be controlled according to the power management signals PWRC1 and PWRC2 applied to the first and second power management circuits. In this embodiment, the power management signals PWRC1 and PWRC2 define or select a power management mode that corresponds to first to fourth values represented by 2-bit data.

The power consumption according to the value of 2-bit data may be defined or selected as shown in Table 2.

TABLE 2

| PWRC1 | PWRC2 | Description |
|---|---|---|
| L | L | Ultra low power |
| L | H | Low power |
| H | L | Normal power |
| H | H | Max power |

According to voltage levels of the power management signals PWRC1 and PWRC2, a low or high-level voltage may be applied to the first power management circuit and the second power management circuit. When a low-level voltage is applied to the first power management circuit and the second power management circuit (fourth value, "LL"), the data driver 400 is controlled to consume a minimum or reduced power (fourth mode). When a high-level voltage is applied to the first power management circuit and the second power management circuit (first value, "HH"), the data driver 400 is controlled to consume the maximum or increased power (first mode). When a low-level voltage is applied to the first power management circuit and a high-level voltage is applied to the second power management circuit (third value, "LH"), the data driver 400 is controlled to consume low power (third mode). When a high-level voltage is applied to the first power management circuit and a low-level voltage is applied to the second power management circuit (second value, "HL"), the data driver 400 is controlled to consume commercial power (second mode).

The eleventh bit is the variable control signal PWRC Con indicating a variable control mode of the power consumption. In the embodiment, the variable control signal PWRC Con may indicate any one of a manual control mode and an auto control mode of the power management circuit PWRC.

In the manual control mode, the power management circuit PWRC does not change the power consumption of the data driver 400 and controls the power consumption to a fixed value. That is, the power management circuit PWRC outputs the bias current Ibias having a fixed value to the output buffer 440.

In the auto control mode, the power management circuit PWRC variably controls the power consumption of the data driver 400 in response to the dimming band. That is, the power management circuit PWRC variably outputs the bias current Ibias to the output buffer 440 in response to the dimming band.

The variable control mode according to a value of 1-bit data may be defined or selected as shown in Table 3.

TABLE 3

| PWRC Con | Description |
|---|---|
| L | PWRC Manual Control |
| H | PWRC Auto Control |

Reserved bits are present after the first power management signal PWRC Con of the first control signal CTR1. The timing controller 100 may indicate the dimming band and whether to limit power corresponding to the dimming band by using at least two of the reserved bits (Band1 and Band2). The number of bits used by the timing controller 100 may be determined in correspondence to a predetermined or selected number i of the dimming bands. Specifically, the timing controller 100 may use $i^{1/2}$ number of bits in order to indicate i number of predefined dimming bands, respectively.

Hereinafter, described will be an embodiment in which the timing controller 100 indicates respectively four predefined dimming bands and whether to limit power corresponding to the dimming bands, by using the twelfth and thirteenth bits. The following embodiments may be appropriately modified and expanded according to the value of i.

The dimming band according to the value of 2-bit data may be defined or selected as shown in Table 4.

TABLE 4

| Band1 | Band2 | Description |
|---|---|---|
| H | H | Band1 -> PWRC default |
| H | L | Band2 -> PWRC down |
| L | H | Band3 -> PWRC down |
| L | L | Band4 -> PWRC down |

In Table 4, "HH" may indicate a first dimming band, "HL" may indicate a second dimming band, "LH" may indicate a third dimming band, and "LL" may indicate a fourth dimming band. In the embodiment, the dimming value DV corresponding to the first dimming band may be greater than the dimming value DV corresponding to the second dimming band. The dimming value DV corresponding to the second dimming band may be greater than the dimming value DV corresponding to the third dimming band. The dimming value DV corresponding to the third dimming band may be greater than the dimming value DV corresponding to the fourth dimming band.

In response to the indicated dimming band, the power consumption may be controlled to be set by the power management signal, or may be limited to be lower than that set by the power management signal. For example, in the first dimming band, the power consumption is controlled to a default value set by the power management signal. In the second to fourth dimming bands, the power consumption is limited to a value set by the dimming band signal.

As such, the timing controller 100 adds the dimming band signal to the data driving control signal and transmits it to the data driver 400. Accordingly, power limitation information according to the dimming band may be transmitted to the data driver 400 without changing the interface on the existing signal.

However, the present embodiment is not limited thereto. In other various embodiments, the dimming band signal may be transmitted from the timing controller 100 to the data driver 400 through a data packet defined separately from (e.g., other than) what is shown in Table 1. The format of the data packet is not particularly limited.

When the dimming band is set to the first value, that is, "HH", the power management circuit PWRC may control the power consumption of the data driver 400 in accordance with a default mode set by the power management signals PWRC1 and PWRC2.

When the dimming band is set to the second value, that is, "HL", the power management circuit PWRC limits the power consumption of the data driver 400 to power consumption corresponding to the second value of the power management signals PWRC1 and PWRC2. That is, when the default mode set by the power management signals PWRC1 and PWRC2 is higher than the power consumption corresponding to the second value, that is, the commercial power, the power management circuit PWRC limits the power consumption of the data driver 400 to the commercial power.

When the dimming band is set to the third value, that is, "LH", the power management circuit PWRC limits the power consumption of the data driver 400 to power consumption corresponding to the third value of the power management signals PWRC1 and PWRC2. That is, when the default mode set by the power management signals PWRC1 and PWRC2 is higher than the power consumption corresponding to the third value, that is, the low power, the power management circuit PWRC limits the power consumption of the data driver 400 to the commercial power.

When the dimming band is set to the fourth value, that is, "LL", the power management circuit PWRC limits the power consumption of the data driver 400 to power consumption corresponding to the fourth value of the power management signals PWRC1 and PWRC2. That is, when the default mode set by the power management signals PWRC1 and PWRC2 is higher than the power consumption corresponding to the fourth value, that is, the minimum or reduced power, the power management circuit PWRC limits the power consumption of the data driver 400 to the minimum or reduced power.

As such, the display device 2 variably controls the power consumption of the data driver 400 in accordance with the dimming value DV within the values set by the power management signals PWRC1 and PWRC2, thereby reducing the power consumption.

The RGB data may include multiple gradation data corresponding to an image to be displayed.

Figure 5:
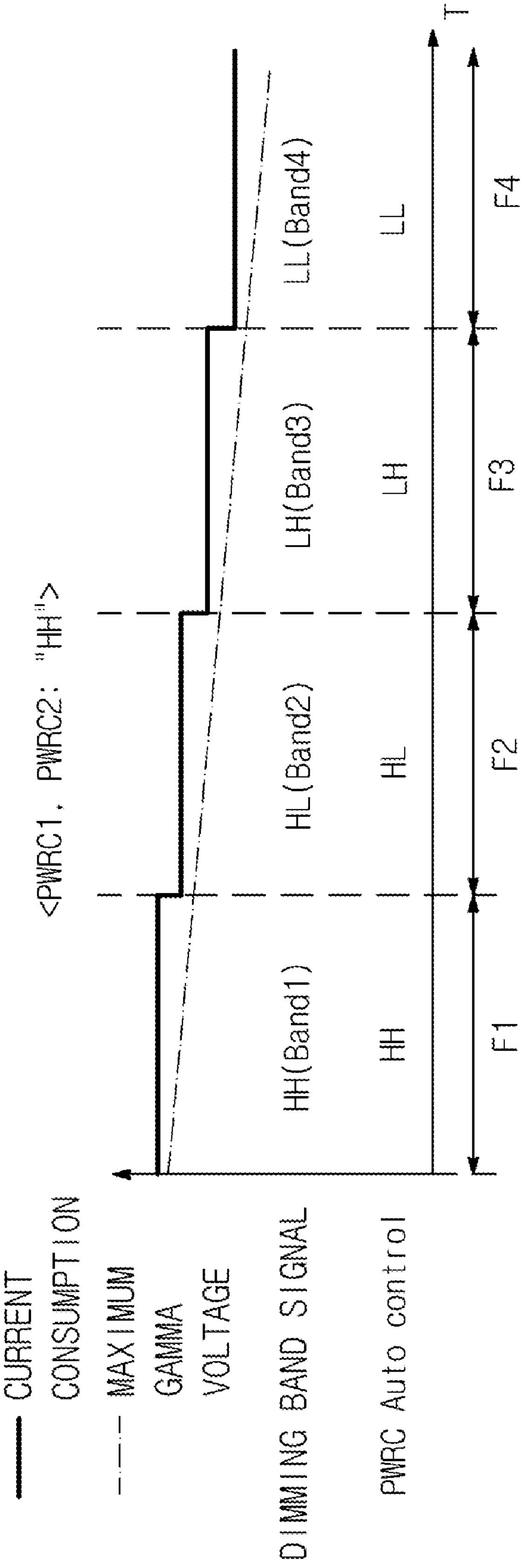
FIG. 5 is a graph showing a power consumption according to a dimming band when a power consumption according to a power management signal is set to a maximum or increased power.

FIG. 5 is a graph showing the power consumption according to the dimming band when the power consumption according to the power management signal is set to the maximum or increased power.

In the embodiment of FIG. 5, the power management signals PWRC1 and PWRC2 are set to "HH". The power management circuit PWRC controls the default value of the power consumption of the data driver 400 to the first mode, that is, to the maximum or increased power in response to the power management signals PWRC1 and PWRC2.

During the control data transmission period CP of the first frame F1, the dimming band is set to "HH". The power consumption in the first dimming band is controlled according to the default value set by the power management signals PWRC1 and PWRC2. Accordingly, during the first frame F1, the power consumption of the data driver 400 is controlled to the maximum or increased power.

During the control data transmission period CP of the second frame F2, the dimming band is set to "HL". The power consumption in the second dimming band is limited to the commercial power corresponding to the value of "HL" of the power management signals PWRC1 and PWRC2. Since the power consumption according to the default value is greater than the power limited by the dimming band, the power consumption of the data driver 400 is controlled to the commercial power during the second frame F2.

During the control data transmission period CP of the third frame F3, the dimming band is set to "LH". The power consumption in the third dimming band is limited to the low power corresponding to the value of "LH" of the power management signals PWRC1 and PWRC2. Since the power consumption according to the default value is greater than the power limited by the dimming band, the power consumption of the data driver 400 is controlled to the low power during the third frame F3.

During the control data transmission period CP of the fourth frame F4, the dimming band is set to "LL". The power consumption in the fourth dimming band is limited to the minimum or reduced power corresponding to the value of "LL" of the power management signals PWRC1 and PWRC2. Since the power consumption according to the default value is greater than the power limited by the dimming band, the power consumption of the data driver 400 is controlled to the minimum or reduced power during the fourth frame F4.

Figure 6:
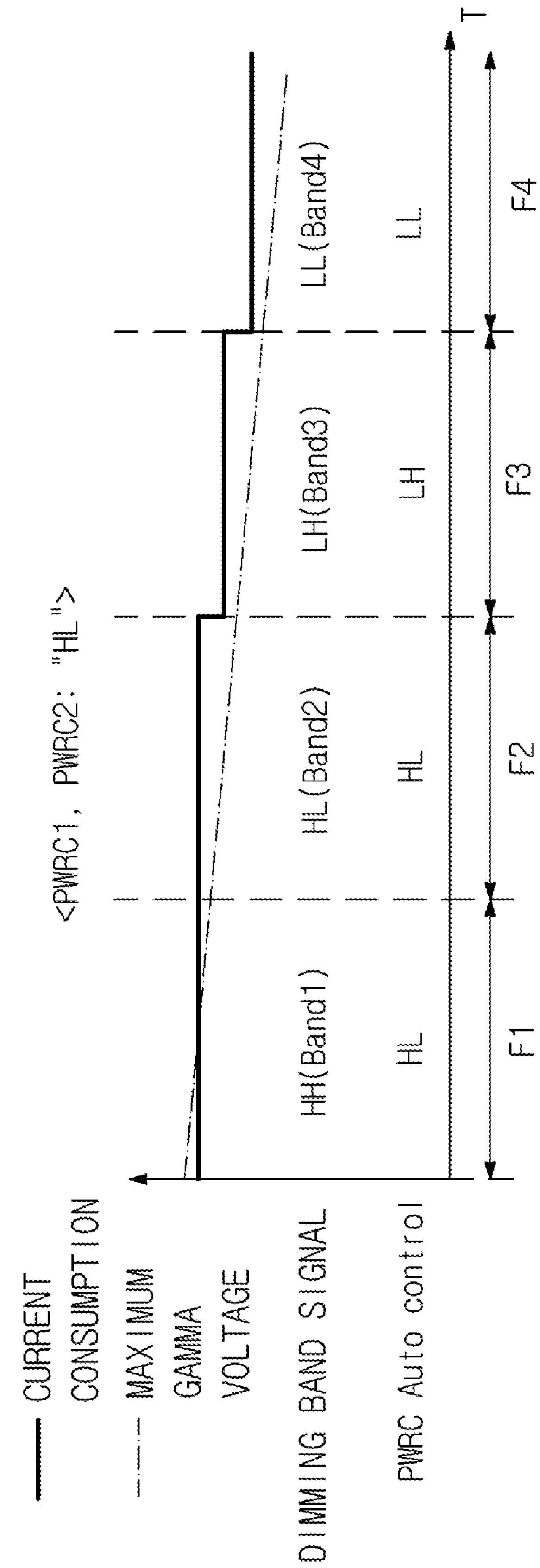
FIG. 6 is a graph showing the power consumption according to the dimming band when the power consumption according to the power management signal is set to a commercial power.

FIG. 6 is a graph showing the power consumption according to the dimming band when the power consumption according to the power management signal is set to the commercial power.

In the embodiment of FIG. 6, the power management signals PWRC1 and PWRC2 are set to "HL". The power management circuit PWRC controls the default value of the power consumption of the data driver 400 to the second mode, that is, to the commercial power in response to the power management signals PWRC1 and PWRC2.

During the control data transmission period CP of the first frame F1, the dimming band is set to "HH". The power consumption in the first dimming band is controlled according to the default value set by the power management signals PWRC1 and PWRC2. Accordingly, during the first frame F1, the power consumption of the data driver 400 is controlled to the commercial power.

During the control data transmission period CP of the second frame F2, the dimming band is set to "HL". The power consumption in the second dimming band is limited to the commercial power corresponding to the value of "HL" of the power management signals PWRC1 and PWRC2. Since the power consumption according to the default value is not greater than the power limited by the dimming band, the power consumption of the data driver 400 is controlled to the commercial power during the second frame F2.

During the control data transmission period CP of the third frame F3, the dimming band is set to "LH". The power consumption in the third dimming band is limited to the low power corresponding to the value of "LH" of the power management signals PWRC1 and PWRC2. Since the power consumption according to the default value is greater than the power limited by the dimming band, the power consumption of the data driver 400 is controlled to the low power during the third frame F3.

During the control data transmission period CP of the fourth frame F4, the dimming band is set to "LL". The power consumption in the fourth dimming band is limited to the minimum or reduced power corresponding to the value of "LL" of the power management signals PWRC1 and PWRC2. Since the power consumption according to the default value is greater than the power limited by the dimming band, the power consumption of the data driver 400 is controlled to the minimum or reduced power during the fourth frame F4.

Figure 7:
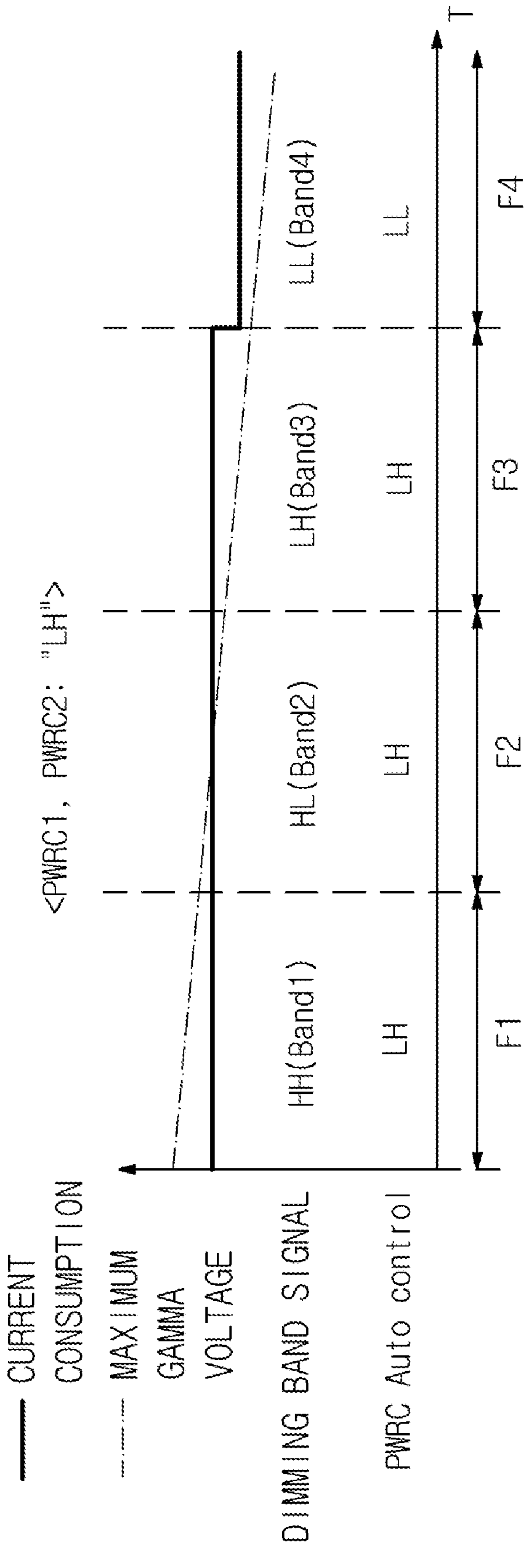
FIG. 7 is a graph showing the power consumption according to the dimming band when the power consumption according to the power management signal is set to a low power.

FIG. 7 is a graph showing the power consumption according to the dimming band when the power consumption according to the power management signal is set to the low power.

In the embodiment of FIG. 7, the power management signals PWRC1 and PWRC2 are set to "LH". The power management circuit PWRC controls the default value of the power consumption of the data driver 400 to the third mode, that is, to the low power in response to the power management signals PWRC1 and PWRC2.

During the control data transmission period CP of the first frame F1, the dimming band is set to "HH". The power consumption in the first dimming band is controlled according to the default value set by the power management signals PWRC1 and PWRC2. Accordingly, during the first frame F1, the power consumption of the data driver 400 is controlled to the low power.

During the control data transmission period CP of the second frame F2, the dimming band is set to "HL". The power consumption in the second dimming band is limited to the commercial power corresponding to the value of "HL" of the power management signals PWRC1 and PWRC2. Since the power consumption according to the default value is not greater than the power limited by the dimming band, the power consumption of the data driver 400 is controlled to the low power during the second frame F2.

During the control data transmission period CP of the third frame F3, the dimming band is set to "LH". The power consumption in the third dimming band is limited to the low power corresponding to the value of "LH" of the power management signals PWRC1 and PWRC2. Since the power consumption according to the default value is not greater than the power limited by the dimming band, the power consumption of the data driver 400 is controlled to the low power during the third frame F3.

During the control data transmission period CP of the fourth frame F4, the dimming band is set to "LL". The power consumption in the fourth dimming band is limited to the minimum or reduced power corresponding to the value of "LL" of the power management signals PWRC1 and PWRC2. Since the power consumption according to the default value is greater than the power limited by the dimming band, the power consumption of the data driver 400 is controlled to the minimum or reduced power during the fourth frame F4.

Figure 8:
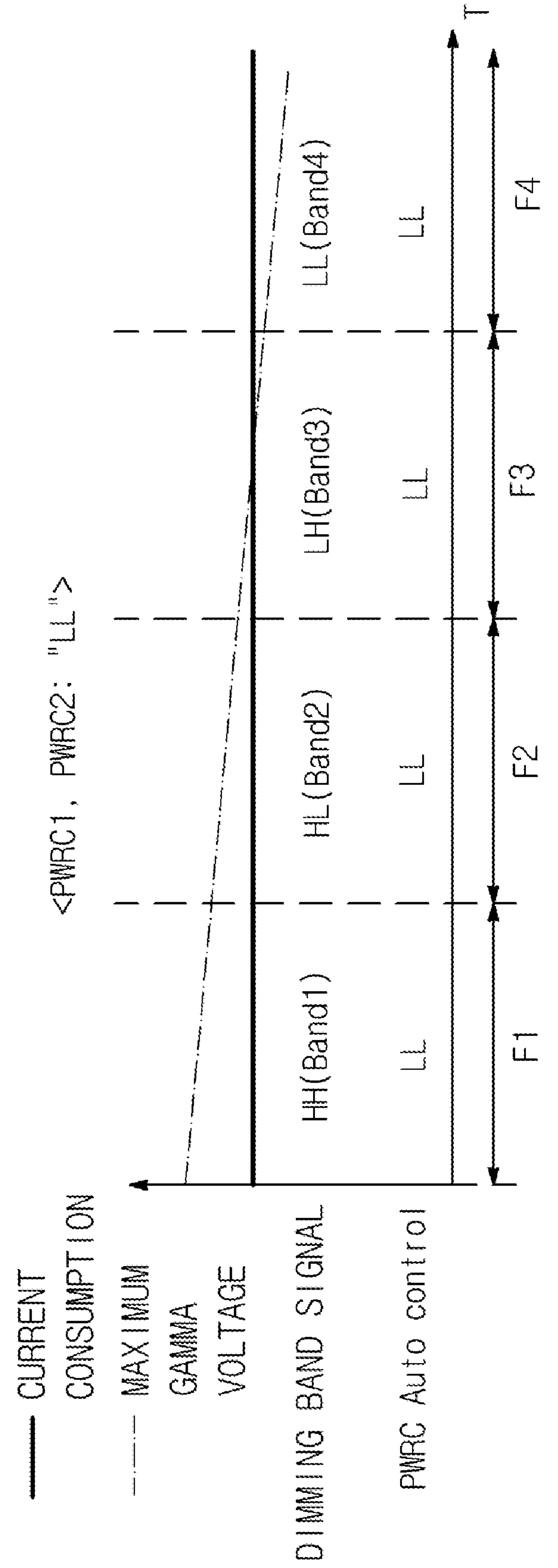
FIG. 8 is a graph showing the power consumption according to the dimming band when the power consumption according to the power management signal is set to a minimum or reduced power.

FIG. 8 is a graph showing the power consumption according to the dimming band when the power consumption according to the power management signal is set to the minimum or reduced power.

FIG. 8 is a graph showing the power consumption according to the dimming band when the power consumption according to the power management signal is set to the minimum or reduced power.

In the embodiment of FIG. 8, the power management signals PWRC1 and PWRC2 are set to "LL". The power management circuit PWRC controls the default value of the power consumption of the data driver 400 to the fourth mode, that is, to the minimum or reduced power in response to the power management signals PWRC1 and PWRC2.

During the control data transmission period CP of the first frame F1, the dimming band is set to "HH". The power consumption in the first dimming band is controlled according to the default value set by the power management signals PWRC1 and PWRC2. Accordingly, during the first frame F1, the power consumption of the data driver 400 is controlled to the minimum or reduced power.

During the control data transmission period CP of the second frame F2, the dimming band is set to "HL". The power consumption in the second dimming band is limited to the commercial power corresponding to the value of "HL" of the power management signals PWRC1 and PWRC2. Since the power consumption according to the default value is not greater than the power limited by the dimming band, the power consumption of the data driver 400 is controlled to the minimum or reduced power during the second frame F2.

During the control data transmission period CP of the third frame F3, the dimming band is set to "LH". The power consumption in the third dimming band is limited to the low power corresponding to the value of "LH" of the power management signals PWRC1 and PWRC2. Since the power consumption according to the default value is not greater than the power limited by the dimming band, the power consumption of the data driver 400 is controlled to the minimum or reduced power during the third frame F3.

During the control data transmission period CP of the fourth frame F4, the dimming band is set to "LL". The power consumption in the fourth dimming band is limited to the minimum or reduced power corresponding to the value of "LL" of the power management signals PWRC1 and PWRC2. Since the power consumption according to the default value is not greater than the power limited by the dimming band, the power consumption of the data driver 400 is controlled to the minimum or reduced power during the fourth frame F4.

According to the display device and the method for driving the same according to the embodiments, it is possible to reduce the power consumption of the display device by changing the power consumption of the data driver.

It can be understood by those skilled in the art that the embodiments can be embodied in other specific forms without departing from its spirit or essential characteristics. Therefore, the foregoing embodiments and advantages are merely examples and are not to be construed as limiting the present disclosure. It can be understood by those skilled in the art that the embodiments can be embodied in other specific forms without departing from its spirit or essential characteristics. Therefore, the foregoing embodiments and advantages are merely examples and are not to be construed as limiting the present disclosure. All modifications, alternatives, and variations derived from the scope and the meaning of the scope of the claims and equivalents of the claims should be construed as being included in the scopes of the embodiments.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel which, in operation, displays an image corresponding to a data signal;

a timing controller which, in operation:

receives a dimming value from outside the display device;

determines a dimming band corresponding to the dimming value;

generates image data and a data driving control signal, the data driving control signal including a power management signal and a dimming band signal, the dimming band signal corresponding to the dimming band; and a data driver which, in operation, receives the image data and the data driving control signal, the data driver including:

a power management circuit configured to output a bias current corresponding to power consumption set by the power management signal on the basis of the dimming band signal directly received from the timing controller; and an output buffer configured to output the data signal corresponding to the image data by using the bias current, wherein the power management circuit is configured to vary the power consumption of the data driver by varying the bias current provided to the output buffer according to the dimming band directly received from the timing controller.

2. The display device of claim 1, wherein, in response to the dimming band signal, the power management circuit controls the power consumption to the power consumption set by the power management signal, or limits the power consumption to power consumption set by the dimming band signal.

3. The display device of claim 2, wherein, when the power consumption set by the power management signal is greater than the power consumption corresponding to the dimming band signal, the power management circuit limits the power consumption to the power consumption corresponding to the dimming band signal, in response to the dimming band signal.

4. The display device of claim 1, wherein the power management signal selects power consumption corresponding to first to i-th values respectively, i being an integer greater than 1, and wherein the power management circuit sets the power consumption corresponding to the power management signal to a default value of the power consumption.

5. The display device of claim 4, wherein the dimming band signal selects whether to limit the power consumption corresponding to the first to i-th values respectively.

6. The display device of claim 5, wherein the power management circuit sets the power consumption to the default value when the dimming band signal has a first value.

7. The display device of claim 6, wherein, when the dimming band signal has a j-th value, j being an integer in a range from 2 to i, and the power consumption set by the power management signal is greater than power consumption corresponding to the j-th value, the power management circuit limits the power consumption to the power consumption corresponding to the j-th value.

8. The display device of claim 1, wherein the data driving control signal further comprises a variable control signal for variably controlling the power consumption, and wherein, in response to the variable control signal, the power management circuit fixes the power consumption to the power consumption set by the power management signal or changes the power consumption set by the power management signal in accordance with the dimming band signal.

9. The display device of claim 1, wherein the power management circuit controls a magnitude of a bias current applied to an output buffer of the data driver, in response to the power consumption.

10. A method for driving a display device, the method comprising:

determining, by a timing controller, a dimming band corresponding to a dimming value input from outside the display device;

generating, by the timing controller, image data and a data driving control signal, the data driving control signal including a power management signal and a dimming band signal corresponding to the dimming value;

outputting, by the timing controller, the image data and the data driving control signal to a data driver;

outputting, by the data driver, a data signal corresponding to the image data, on the basis of the data driving control signal, the data driver having power consumption set by the power management signal and limited on the basis of the dimming band signal received from the timing controller; and displaying, by a display panel, an image corresponding to the data signal, wherein the outputting the data signal by the data driver includes:

setting, by a power management circuit, the power consumption set by the power management signal to a default value;

controlling the power consumption to the default value, in response to the dimming band signal;

outputting a bias current to an output buffer in response to the controlled power consumption; and outputting, by the output buffer, the data signal corresponding to the image data by using the bias current.

11. The method of claim 10, wherein the outputting the data signal by the data driver comprises:

setting, by a power management circuit, the power consumption set by the power management signal to a default value;

limiting, by the power management circuit, the power consumption to power consumption set by the dimming band signal, in response to the dimming band signal;

outputting a bias current to an output buffer in response to the limited power consumption; and outputting, by the output buffer, the data signal corresponding to the image data by using the bias current.

12. The method of claim 10, wherein the power management signal selects power consumption corresponding to first to i-th values, respectively, i being an integer greater than 1, and wherein the outputting the data signal by the data driver includes setting the power consumption corresponding to the power management signal to a default value of the power consumption.

13. The method of claim 12, wherein the dimming band signal selects whether to limit the power consumption corresponding to the first to i-th values respectively.

14. The method of claim 13, further comprising, after the setting the power consumption corresponding to the power management signal to the default value of the power consumption, setting the power consumption to the default value when the dimming band signal has a first value.

15. The method of claim 14, further comprising, after the setting the power consumption corresponding to the power management signal to the default value of the power consumption, when the dimming band signal has a j-th value, j being an integer in a range from 2 to i, and the power consumption set by the power management signal is greater than power consumption corresponding to the j-th value, limiting the power consumption to the power consumption corresponding to the j-th value.

16. The method of claim 10, wherein the data driving control signal further includes a variable control signal for variably controlling the power consumption, and wherein the outputting the data signal by the data driver includes, in response to the variable control signal, fixing the power consumption to the power consumption set by the power management signal or changing the power consumption set by the power management signal in accordance with the dimming band signal.

17. The method of claim 16, wherein the changing the power consumption set by the power management signal in accordance with the dimming band signal includes controlling a magnitude of a bias current applied to an output buffer of the data driver, in response to the power consumption.

18. A display device comprising:

a display panel which, in operation, displays an image corresponding to a data signal;

a timing controller which, in operation:

generates image data and a data driving control signal, the data driving control signal including a power management signal and a dimming band signal; and outputs the image data and the data driving control signal to a data driver; and the data driver including a power management circuit having a first power management circuit and a second power management circuit, wherein the data driver, in operation:

selects a power management mode associated with a first bias current, including:

applying a first voltage to the first power management circuit based on a first bit of the data driving control signal; and applying a second voltage to the second power management circuit based on a second bit of the data driving control signal; and controls the power management circuit to output a second bias current having a level lower than that of the first bias current based on the dimming band signal.

19. The display device of claim 18, wherein the data driving control signal includes a variable control signal, and the data driver is operable to, in response to the variable control signal indicating a manual control mode, control the power management circuit to output the first bias current that exceeds the second bias current.

* * * * *